US011093979B2

(12) United States Patent
Strutton et al.

(10) Patent No.: US 11,093,979 B2
(45) Date of Patent: Aug. 17, 2021

(54) MACHINE LEARNING SYSTEM FOR CONFIGURING SOCIAL MEDIA CAMPAIGNS

(71) Applicant: Oracle International Corporation, Redwood Shores, CA (US)

(72) Inventors: Michael J. Strutton, Villa Rica, GA (US); John B. Nolt, Atlanta, GA (US); Chad Estes, Atlanta, CA (US); Kimberly Ann Wolfe, Decatur, GA (US); Yizhou Jiang, Belmont, CA (US); Natalie You, Mountain View, CA (US); Wenhua Li, Palo Alto, CA (US); Tara U. Roberts, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 230 days.

(21) Appl. No.: 16/239,057

(22) Filed: Jan. 3, 2019

(65) Prior Publication Data
US 2019/0156373 A1    May 23, 2019

Related U.S. Application Data

(63) Continuation-in-part of application No. 14/491,387, filed on Sep. 19, 2014, now abandoned.
(Continued)

(51) Int. Cl.
*G06Q 30/02*    (2012.01)
*G06N 20/00*    (2019.01)
(Continued)

(52) U.S. Cl.
CPC ....... *G06Q 30/0276* (2013.01); *G06K 9/6219* (2013.01); *G06N 20/00* (2019.01);
(Continued)

(58) Field of Classification Search
CPC .......... G06Q 30/0201; G06Q 30/0202; G06Q 30/0241; G06Q 30/0242; G06Q 30/0244;
(Continued)

(56) References Cited

U.S. PATENT DOCUMENTS 8,352,318 B2    1/2013  Rikhtverchik et al.
8,788,334 B2    7/2014  Rose et al.
(Continued)

OTHER PUBLICATIONS

Chen, H et al. Business Intelligence and Analytics: From Big Data to Big Impact. MIS Quarterly, vol. 36, No. 4, Dec. 2012, pp. 1165-1188 [online], [retrieved on Mar. 26, 2021], Retrieved from the Internet: <URL:http://citeseerx.ist.psu.edu/viewdoc/download?doi=10.1.1.717.5529&rep=rep1&type=pdf > (Year: 2012).*

*Primary Examiner* — Waseem Ashraf
*Assistant Examiner* — Jonathan J Whitaker
(74) *Attorney, Agent, or Firm* — Invoke

(57) ABSTRACT

Techniques for using machine learning to configure social media campaigns are disclosed. A social relationship management (SRM) service performs supervised machine learning to generate a learned model, at least by: generating feature vectors based on training data including campaign configuration data and one or more campaign success metrics; and performing pattern recognition on the feature vectors to determine one or more preferred campaign configurations. The SRM service publishes messages to one or more social media platforms and receives user interaction data associated with users' interactions with the messages. The SRM service performs unsupervised machine learning to update the learned model based at least in part on the user interaction data. The SRM service receives a request to configure a social media campaign, applies data associated with the request to the learned model to determine a preferred campaign configuration, and configures the social (Continued)

media campaign based on the preferred campaign configuration.

24 Claims, 18 Drawing Sheets

Related U.S. Application Data

(60) Provisional application No. 61/880,038, filed on Sep. 19, 2013.

(51) Int. Cl.
*G06Q 50/00* (2012.01)
*G06K 9/62* (2006.01)
*H04L 12/58* (2006.01)
*G06K 9/66* (2006.01)

(52) U.S. Cl.
CPC ...... *G06Q 30/0201* (2013.01); *G06Q 30/0202* (2013.01); *G06Q 30/0241* (2013.01); *G06Q 30/0242* (2013.01); *G06Q 30/0244* (2013.01); *G06Q 30/0246* (2013.01); *G06Q 30/0254* (2013.01); *G06Q 50/01* (2013.01); *H04L 51/18* (2013.01); *H04L 51/32* (2013.01); *G06K 9/66* (2013.01)

(58) Field of Classification Search
CPC ............... G06Q 30/0254; G06Q 50/01; G06Q 30/0276; G06N 20/00; G06K 9/66
See application file for complete search history.

(56) References Cited

U.S. PATENT DOCUMENTS

| | | | |
|---|---|---|---|
| 9,497,278 | B2 | 11/2016 | McIntosh et al. |
| 2005/0160002 | A1* | 7/2005 | Roetter .............. G06Q 30/0255 705/14.42 |
| 2006/0212350 | A1* | 9/2006 | Ellis .................. G06Q 30/0254 705/14.41 |
| 2010/0023392 | A1 | 1/2010 | Merriman et al. |
| 2010/0180013 | A1 | 7/2010 | Shkedi |
| 2011/0313996 | A1 | 12/2011 | Strauss et al. |
| 2012/0190386 | A1 | 7/2012 | Anderson |
| 2013/0117108 | A1* | 5/2013 | Spears ............... G06Q 30/0255 705/14.53 |
| 2013/0159298 | A1 | 6/2013 | Mason et al. |
| 2013/0179534 | A1 | 7/2013 | Sanghavi et al. |
| 2014/0129733 | A1 | 5/2014 | Klais |
| 2014/0136451 | A1* | 5/2014 | Marti ..................... G06N 20/00 706/12 |
| 2014/0143337 | A1 | 5/2014 | McIntosh et al. |
| 2014/0180788 | A1 | 6/2014 | George et al. |
| 2015/0006295 | A1* | 1/2015 | Liu .................... G06Q 30/0269 705/14.66 |
| 2015/0081419 | A1 | 3/2015 | Strutton et al. |
| 2015/0347924 | A1* | 12/2015 | Zeng ..................... G06N 7/005 706/12 |

* cited by examiner

| | A | B | C | D | E | F | G |
|---|---|---|---|---|---|---|---|
| 1 | | Unique Visitors | Total Bookings | Campaign Clickthroughs | Sessions | Total Booking Value | Basic Booking |
| 2 | Jan '13 | 1,678 | 178 | 11,267 | 6,793 | $89,345 | |
| 3 | Feb '13 | 1,509 | 164 | 10,480 | 6,109 | $74,903 | |
| 4 | Mar '13 | 2,183 | 226 | 11,675 | 6,498 | $89,690 | |
| 5 | Apr '13 | 2,714 | 253 | 12,037 | 6,823 | $91,032 | |
| 6 | May '13 | 2,167 | 198 | 11,987 | 6,234 | $87,398 | |
| 7 | | | | | | | |
| 8 | | | | | | | |
| 9 | | | | | | | |
| 10 | | | | | | | |

FIG. 2E

*Example:*
www.destinationpage.com/products/productname/?utm_campaign=Social&utm_medium=Facebook&utm_term=Timeline%20Post&utm_name=Fall%20Promotion%202013

*Breakdown:*
www.destinationpage.com/products/productname/?utm_campaign=Social&
utm_medium=Facebook&
utm_term=Timeline%20Post&
utm_name=Fall%20Promotion%202013

MACHINE LEARNING SYSTEM FOR CONFIGURING SOCIAL MEDIA CAMPAIGNS

CROSS-REFERENCE TO RELATED APPLICATIONS

The present application is a continuation-in-part of U.S. patent application Ser. No. 14/491,387, entitled "Method and System for Implementing Dynamic Link Tracking," filed on Sep. 19, 2014, which is hereby incorporated by reference in its entirety.

The present application claims the benefit of priority to U.S. Provisional Application Ser. No. 61/880,038, filed on Sep. 19, 2013, which is hereby incorporated by reference in its entirety.

The present application is related to U.S. patent application Ser. No. 14/491,573, entitled "Method and System for Tracking Consumer Digital Body Language", filed on Sep. 19, 2014, which is hereby incorporated by reference in its entirety.

The Applicant hereby rescinds any disclaimer of claim scope in the parent application(s) or the prosecution history thereof and advises the USPTO that the claims in this application may be broader than any claim in the parent application(s).

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The present application relates to software development and more specifically to systems and methods for implementing enterprise software applications.

The popularity of social media websites and portals, such as Facebook, Twitter, and others in recent years has provided marketers and advertisers with new avenues and opportunities for marketing their products and services. Social media sites provide a platform for individual consumers and marketers to communicate and interact, e.g., through Facebook pages or Twitter handles. Marketers can post messages or advertisements on these social media systems as a way to advertise outside traditional marketing channels. Consumers, in turn, can respond by clicking on embedded links, replying to the messages, share posts based on the messages, or performing other site-specific functions. Further, marketers can embed an organization-specific or marketing campaign-specific URLs (Webpage address) within the messages, driving users and Web traffic to a separate Web site.

When a marketer is implementing a campaign or promotion, it is important to be able to obtain data to assess the success of the campaign or promotion. For example, the marketers may wish to know how many users and/or what kinds of users clicked on a URL associated with a social media post in a given month. If the same URL was published in multiple social media posts (e.g., the same URL was published in a Twitter post, and also in a separate post on a Facebook page), the marketer may wish to know from which source the URL visits originate from. Number of URL clicks that resulted in an order/sale may also be desired.

Tracking may be done through the use of tracking URLs, which may comprise various tracking parameters appended to a base URL. The additional parameters may be read by a tracking service for analysis. However, tracking URLs are often difficult for most marketing personnel, who do not have technical expertise, to write, and different types of tracking services for collecting and analyzing the data from the tracking URLs often each have their own specific tracking URL formats.

Therefore, there is a need for an improved approach to implement dynamically-created links for tracking consumer behaviors and trends.

SUMMARY

Embodiments described herein allow a social relationship management (SRM) service to use machine learning techniques to improve the performance of social media marketing campaigns. The SRM service uses data from user interactions with prior social media campaigns to train and update a learned model that identifies patterns corresponding to preferred campaign configurations. The SRM service configures social media campaigns based on those patterns.

Alternatively or in addition, the present application presents an improved approach for dynamically generating tracking links. In some embodiments, the present invention allows for the defining of tracking link templates allowing a user to specify parameters usable by a tracking service. One or more post parameters and one or more custom parameters may be defined. SRM posts may then be created by a user through an SRM interface, and a tracking URL be automatically created by reading in the post parameters and one or more user-inputted custom parameters.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE FIGURES

The present invention is illustrated by way of example, and not by way of limitation, in the figures of the accompanying drawings and in which like reference numerals refer to similar elements and in which:

FIG. 2E illustrates an example analysis by a tracking service that may be used with some embodiments.

FIG. 3B illustrates an appended tracking URL in accordance with some embodiments.

FIGS. 4A-4B illustrate a user interface for creating a tracking URL template in accordance with some embodiments.

FIG. 8 illustrates a user interface for viewing an SRM post history in accordance with some embodiments.

DETAILED DESCRIPTION

Figure 1:
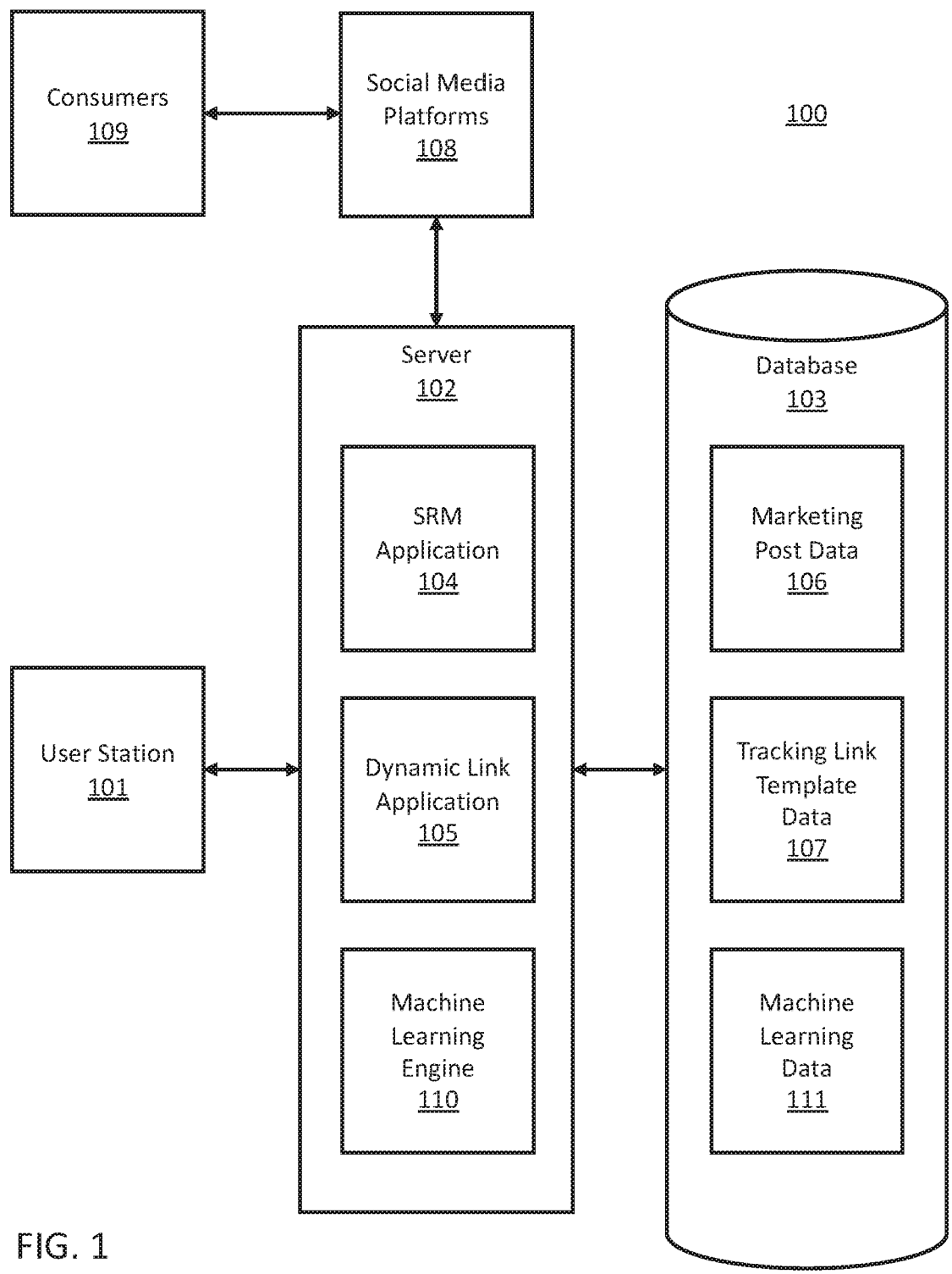
FIG. 1 illustrates an architecture of implementing dynamic link tracking in accordance with some embodiments.

Embodiments described herein use machine learning techniques to configure social media campaigns. Alternatively or in addition, embodiments of the invention provide an improved approach for dynamically generating tracking links for SRM posts in order to assess campaign effectiveness and consumer behavior. Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of SRM applications. It is noted, however, that the invention is not limited in its scope to SRM applications, and indeed, may be applied to other types of applications as well.

FIG. 1 shows an architecture of a system 100 according to some embodiments. The users operate the system at user station 101 to access and utilize applications on an application server 102, such as an SRM application 104 and a dynamic links application 105. In general, the application server 102, and functionality associated with the application server 102, may be referred to as an SRM service. Applications on the application server 102 may access data on database 103, which may include marketing post data 106 and tracking link template data 107. As described in more detail below, the users at user station 101 may use the dynamic links application 105 to create and/or modify tracking link templates for generating dynamic tracking links. These templates may be stored in tracking link template data 107, and may correspond to tracking URL formats used by one or more tracking services.

The users may also use SRM application 104 to create and/or manage posts and messages on various social media sites or platforms. Marketing post data 106 may include content that the user may wish to include in the social media posts and messages, such as graphics, videos, and/or standardized text and post templates. Posts created by the user are then published to one or more social media platforms 108, such as Facebook, Twitter, etc., where they may be viewed by one or more consumers 109, which may correspond to any users of a social media site. In addition, in some embodiments post may also be published as emails (e.g., sent to addresses on a mailing list) or to non-social media websites.

In some posts and messages, the user may wish to include a URL to (hive consumers to a different website, such as a website to order a product or enter a code for a promotion. In order to track consumer behavior (e.g., how many consumers clicked the URL), the URL may include various parameters and tags for tracking purposes. These parameters may be defined by the tracking link templates stored at 107. Some parameters for the tracking link may be retrieved automatically when the user creates a post (e.g., which social media site the post is published to, post ID, post timestamp, etc.), while other parameters may be specifically specified by the user (e.g., name of campaign that the post is associated with).

In system 100, user station 101 comprises any type of computing station that may be used to operate or interface with a server 102. Examples of such user stations 101 include for example, workstations, personal computers, laptop computers, or remote computing terminals. User station 101 may also comprise any type of portable tablet device, including for example, tablet computers, portable readers, etc., or mobile device that can suitably access an application on application server 102, such as smartphones and programmable mobile handsets. User station 101 usually includes a display device, such as a display monitor or screen, for displaying scheduling data and interface elements to users. User station 101 may also comprise one or more input devices for the user to provide operational control over the activities of system 100, such as a mouse, touch screen, keypad, or keyboard. The users may correspond to any individual, organization, or other entity that uses system 100 to remotely access applications on application server 102, such as a dynamic link tracking application or SRM application on application server 102.

The database 103 may correspond to any type of computer readable mediums or storage devices. The computer readable storage devices comprise any combination of hardware and software that allows for ready access to the data within the database. For example, the computer readable storage device could be implemented as computer memory or disk drives operatively managed by an operating system.

In an embodiment, the server 102 includes a machine learning engine 110. The machine learning engine 110 may refer to any combination of hardware and/or software configured to use machine learning techniques, as described herein, to configure one or more social media campaigns. The machine learning engine 110 may use data gathered and/or generated by the server 102 to train and update a learned model for configuring social media campaigns. The machine learning engine 110 may store the learned model in a database 103 as machine learning data 111. Alternatively or in addition, the machine learning engine 110 may store other data, used to train and/or update the learned model, in the machine learning data 111.

In an embodiment, the machine learning engine 110 performs supervised machine learning to generate the learned model. Supervised machine learning may use labeled training data. The labeled training data may include campaign configuration data associated with prior social media campaigns. The campaign configuration data may include one or more of: campaign templates used, user-selected variable values, content localization settings, promotional offers, message contents, and/or any other kind of campaign configuration data or combination thereof. Alternatively or additionally, the labeled training data may include one or more campaign success metrics. A campaign success metric indicates, for a particular social media campaign, how successful the social media campaign is/was at achieving a particular campaign objective. Campaign success metrics may include measurements of one or more of: tracking URL clickthrough rates, message viewing times, conversion rates, costs per click, and/or any other kind of campaign success metric or combination thereof.

In an embodiment, to generate the learned model, the machine learning engine 110 generates feature vectors based on the training data. The machine learning engine 110 may then perform pattern recognition on the feature vectors, to determine one or more preferred campaign configurations. A campaign configuration may be considered "preferred" if it is associated with one or more campaign success metrics that are better (e.g., higher if higher numbers indicate more success for a particular metric, or lower if lower numbers indicate more success for a particular metric) than those for other campaign configurations. A preferred campaign configuration may be a new campaign template, not previously used with any social media campaign on which the learned model is based. The learned model may determine, based on patterns in the feature vectors, a preferred campaign configuration corresponding to a combination of different features of campaign configurations that were previously used, even though no single previous campaign configuration included that particular combination of features. Alternatively or additionally, the machine learning engine 110 may use other machine learning techniques to determine a preferred campaign configuration.

In an embodiment, the machine learning engine 110 updates the learned model on an ongoing basis, using unsupervised learning. Specifically, the machine learning engine 110 may update the learned model based on data obtained from social media users' interactions with published messages. The user interaction data may be data obtained via tracking URLs, as described herein. In an embodiment, unsupervised learning is based at least in part on quantified measurements of the user interaction data. Unsupervised learning may cluster campaigns, using an unsupervised clustering algorithm (e.g., k-means clustering, hierarchical clustering, and/or another clustering algorithm). Unsupervised learning may detect a particular cluster of campaigns having similar characteristics, where the quantified measurements for the particular cluster are expected to be higher than other clusters for particular request parameters. The user interaction data may relate to one or more campaign success metrics (e.g., click-through rates and/or any other campaign success metric as described herein), and may therefore have a corresponding impact on the preferred campaign configuration(s) identified by the learned model. The user interaction data may include one or more of: tracking uniform resource locator (URL) parameters, tracking URL parameter values, tracking URL clickthrough rates, message viewing times, conversion rates, costs per click, social media platforms targeted, user demographics (e.g., age, sex, location, likes, interests, etc.), or any other kind of user interaction data or combination thereof.

In an embodiment, when the SRM application 104 receives a request to configure a social media campaign, the SRM application 104 uses the machine learning engine 110 to determine a preferred configuration for the social media campaign. Specifically, the machine learning engine 110 may apply data associated with the request to the learned model, to determine a preferred configuration for the social media campaign. The request may specify certain parameters. Applying data to the learned model may involve selecting campaign characteristics based on the particular cluster of campaigns having quantified measurements that are expected to be higher than other clusters for the particular request parameters. Quantified measurements may include sentiment, engagement, and/or any other kind of quantified measurement or combination thereof. Different degrees of positive terms may be given different scores, based on how positive they are. Different levels of engagement may be assigned different values, based on how many users are reached through the social media interactions. Machine learning may maximize, relatively with respect to different clusters of similar messages, one or more quantified measurements such as engagement, sentiment, etc. In an embodiment, the machine learning engine 110 vectorizes quantified measurements being stored in a cloud storage environment. The cloud storage environment may be access-controlled to secure the vectorized quantifications for access to perform unsupervised machine learning.

In one example, the request includes a mandatory configuration setting for the social media campaign. The mandatory configuration setting may indicate a particular social media stream to target, a product being marketed in the social media campaign, a demographic being targeted, and/or any other kind of setting or combination thereof that a user designates as mandatory for the social media campaign. The machine learning engine 110 accesses the learned model to determine a preferred campaign configuration that satisfies the mandatory configuration setting(s). In another example, the request indicates a particular business objective for the social media campaign. The business objective may include one or more of: maximizing click-through rates, maximizing viewing time for a video, maximizing conversions e.g., sign-ups for a newsletter, product sales, etc.), or any other kind of business objective or combination thereof. The machine learning engine 110 accesses the learned model to determine a preferred campaign configuration for achieving the designated business objective(s).

In an embodiment, the SRM application 104 configures the social media campaign based on the preferred campaign configuration identified by the machine learning engine 110. The SRM application 104 may generate a campaign configuration recommendation and present the recommendation to a user via a graphical user interface (GUI). If the user accepts the recommendation, then the SRM application 104 may apply the preferred campaign configuration to the social media campaign. Alternatively or additionally, the SRM application 104 may apply one or more configuration settings from the preferred campaign configuration to the social media campaign without requesting or receiving additional user input.

Figure 2A:
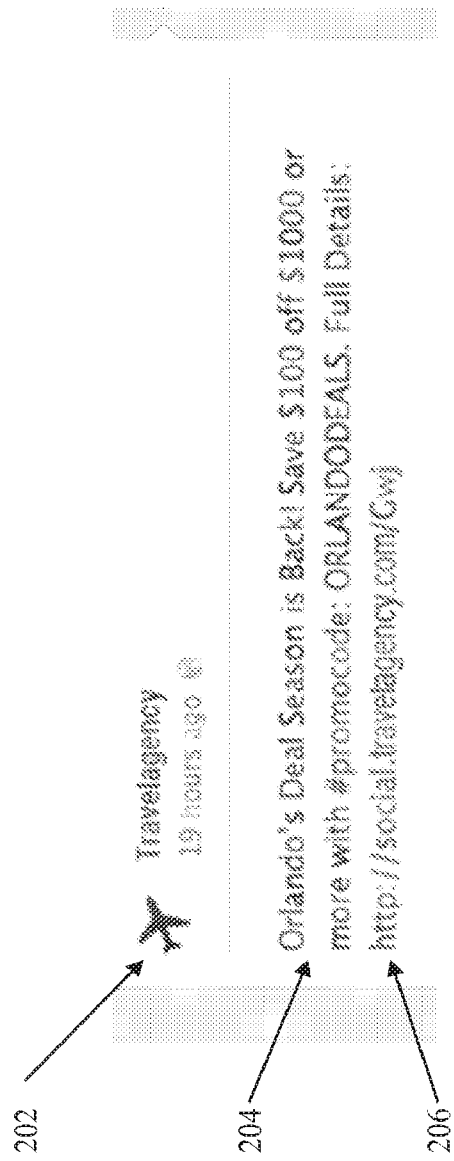
FIG. 2A illustrates an SRM post in accordance with some embodiments.

FIG. 2A illustrates an example post that may be created by a user and published to a social media site by a hypothetical marketer (TravelAgency). In the illustrated example, as indicated at 202, the post is created by a user associated with or representing TravelAgency. The content 204 of the post may comprise text describing a product, campaign, or promotion. In some embodiments, the content may also include pictures, videos, and/or other media.

A URL 206 may also be included in the post. In some embodiments, the URL 206 may be a shortened URL. A shortened URL may be used in cases where displaying a full tracking URL is undesirable (e.g., for aesthetic reasons, or to adhere to post character limits for a particular social media site), and maps to a full tracking URL. When a consumer or social media user (hereinafter, collectively "consumers") clicks on the URL, they will be taken to a page corresponding with a destination URL, while tracking information associated with the tracking URL may be read by one or more tracking services for analysis.

Figure 2B:
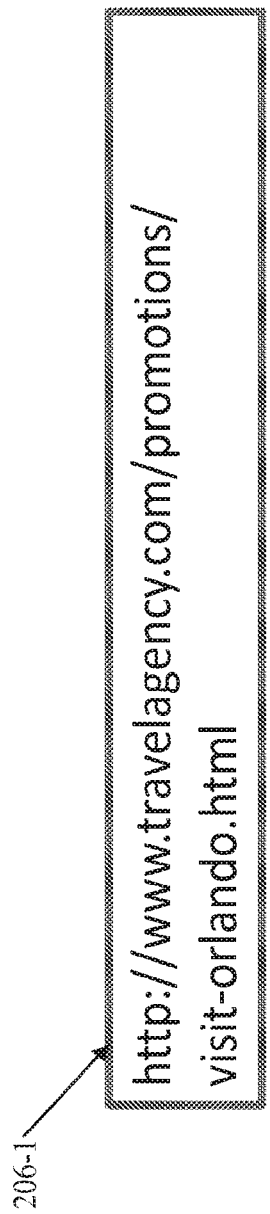
FIGS. 2B-2C illustrate a base URL and a tracking URL in accordance with some embodiments.
Figure 2C:
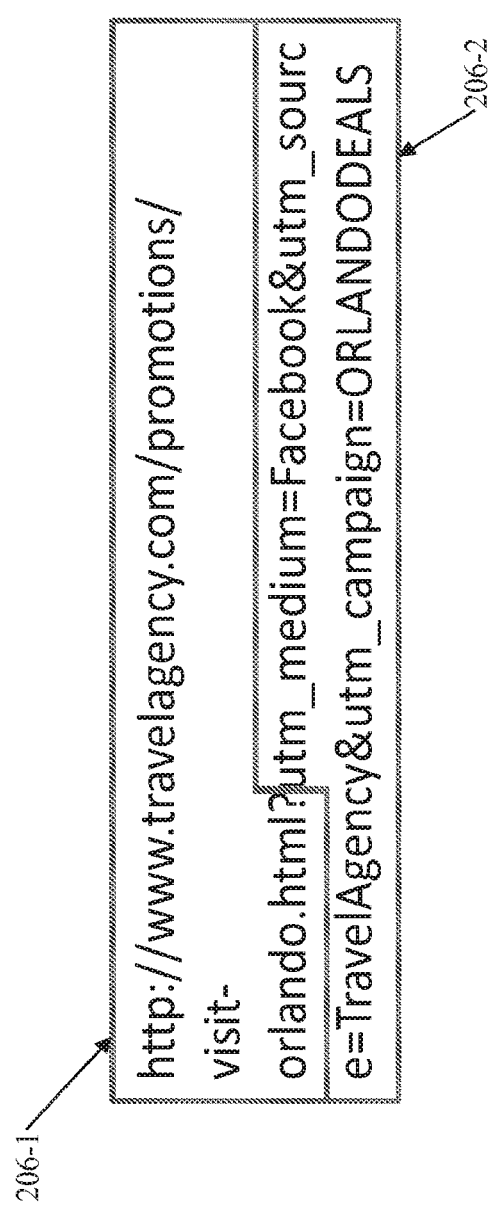

FIGS. 2B and 2C illustrate an example destination URL and tracking URL in accordance with some embodiments. The destination URL 206-1 illustrated in FIG. 2B corresponds to a URL for a page that the consumer reaches by clicking on a link in a social media message or post. For example, the destination URL 206-1 may point to a landing page containing details for a promotion that is currently being run by the marketer.

As illustrated in FIG. 2C, a tracking URL may contain a destination URL 206-1 appended with a query string 206-2 containing one or more tracking parameters. For example, the query string 206-2 of the tracking URL may contain parameters that specify the stream or medium that the post containing the URL was published on (e.g., Facebook), the source of the post (e.g., Travel Agency), and the marketing campaign that the post is associated with (e.g., Orlando Deals). A tracking system or program may be used to parse the tracking URL, reading in the tracking parameters of the tracking URL from query string 206-2, and redirecting the user to the address specified by the destination URL 206-1.

Figure 2D:
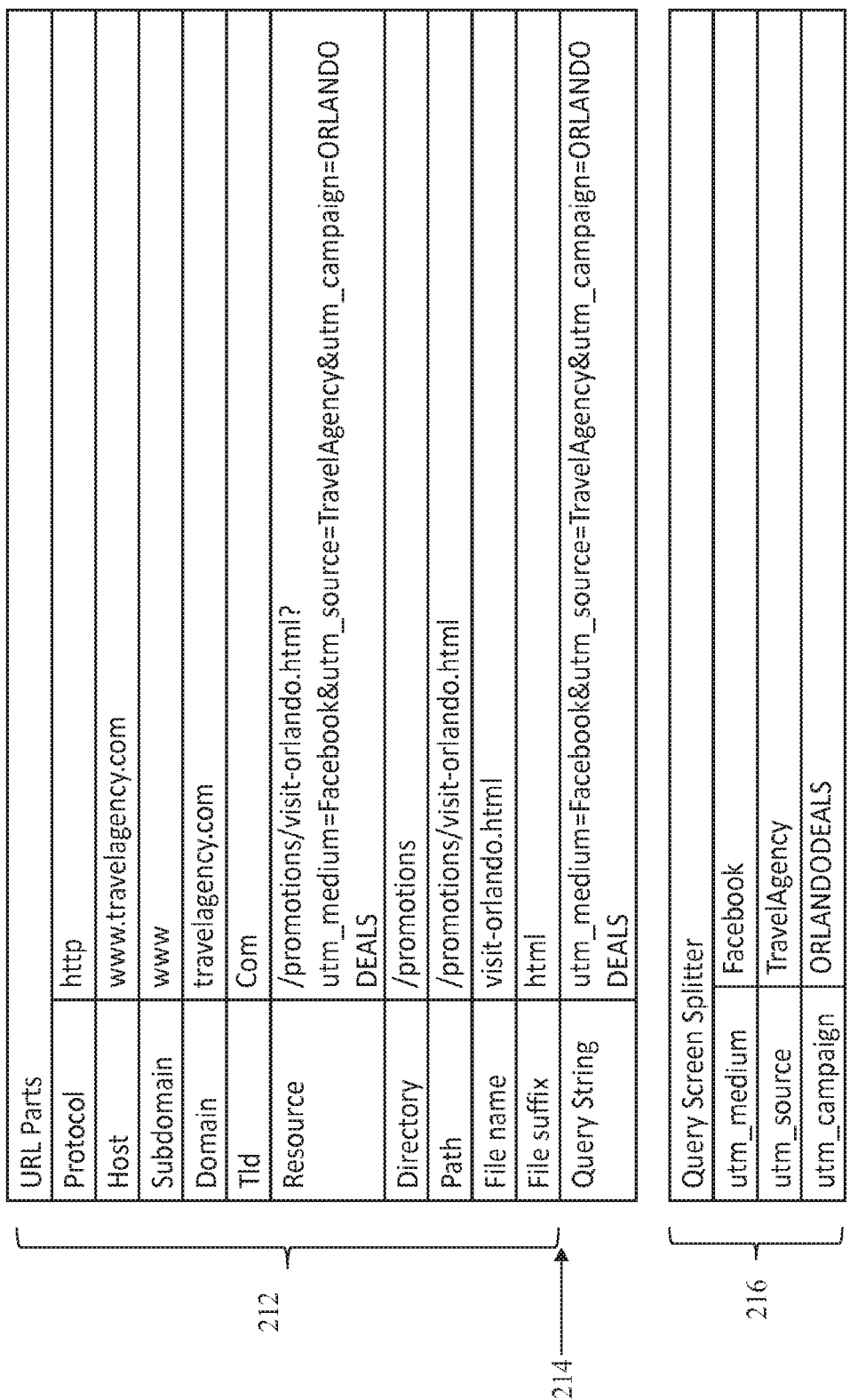
FIG. 2D illustrates a tracking service that may be used with some embodiments.

FIG. 2D illustrates an example screen of a parsing service that parses tracking URLs in accordance with some embodiments. As illustrated in the figure at 212, the tracking service determines the domain (travelagency.com) and path (/promotions/visit-orland.html) that make up the destination URL 206-1, and identifies the query string 206-2 at 214. The query string 206-2 may then be parsed at 216 to determine the values for the separate parameters that comprise the query string 206-2 (e.g., medium, source, and campaign).

The data received by the tracking service may be used to analyze the results of a campaign or promotion. For example, FIG. 2E illustrates an example of an analysis of a campaign using tracking URLs. The tracking service is able to determine how many users clicked a particular URL, as well as determine the number of sales/orders/bookings that were achieved through the URL and the revenue received through the URL. In some embodiments, the data may be further divided by tracking parameters. For example, the tracking service may be able to determine how many clicks to a particular destination URL were received from a particular Twitter post, and compare it to the number of clicks from a particular Facebook post, allowing a user to analyze which types of posts are experiencing the most success.

Different types of tracking services may be used to track user behavior, such as Google Analytics or Adobe Site Catalyst. However, the tracking tags for each of these different tracking services may be in different formats, or constructed in different ways. For example, some tracking services may use tracking URLs in a wrapped format, while others use tracking URLs in an appended format.

Figure 3A:
FIG. 3A illustrates a wrapped tracking URL in accordance with some embodiments.

FIG. 3A illustrates an example URL in a wrapped format. In a wrapped URL, a base URL 302, instead of pointing to a landing page, points to a URL associated with the tracking service (e.g., Eloqua). The query string 304 appended to the base URL 302 may contain tracking parameters such as post ID, social media platform published on, post source, campaign/promotion, etc. The destination URL 306 is also specified as part of the parameters of query string 304. When parsing the wrapped URL, the tracking service will extract the destination URL 306 from query string 304, and redirect the consumer to the landing page corresponding to the destination URL.

On the other hand, FIG. 3B illustrates an example tracking URL in an appended format. In the appended format, the base URL 302 is the destination URL corresponding to the landing page. One or more tracking parameters are appended to the end of the base URL 302 as query string 304.

Figure 4A:
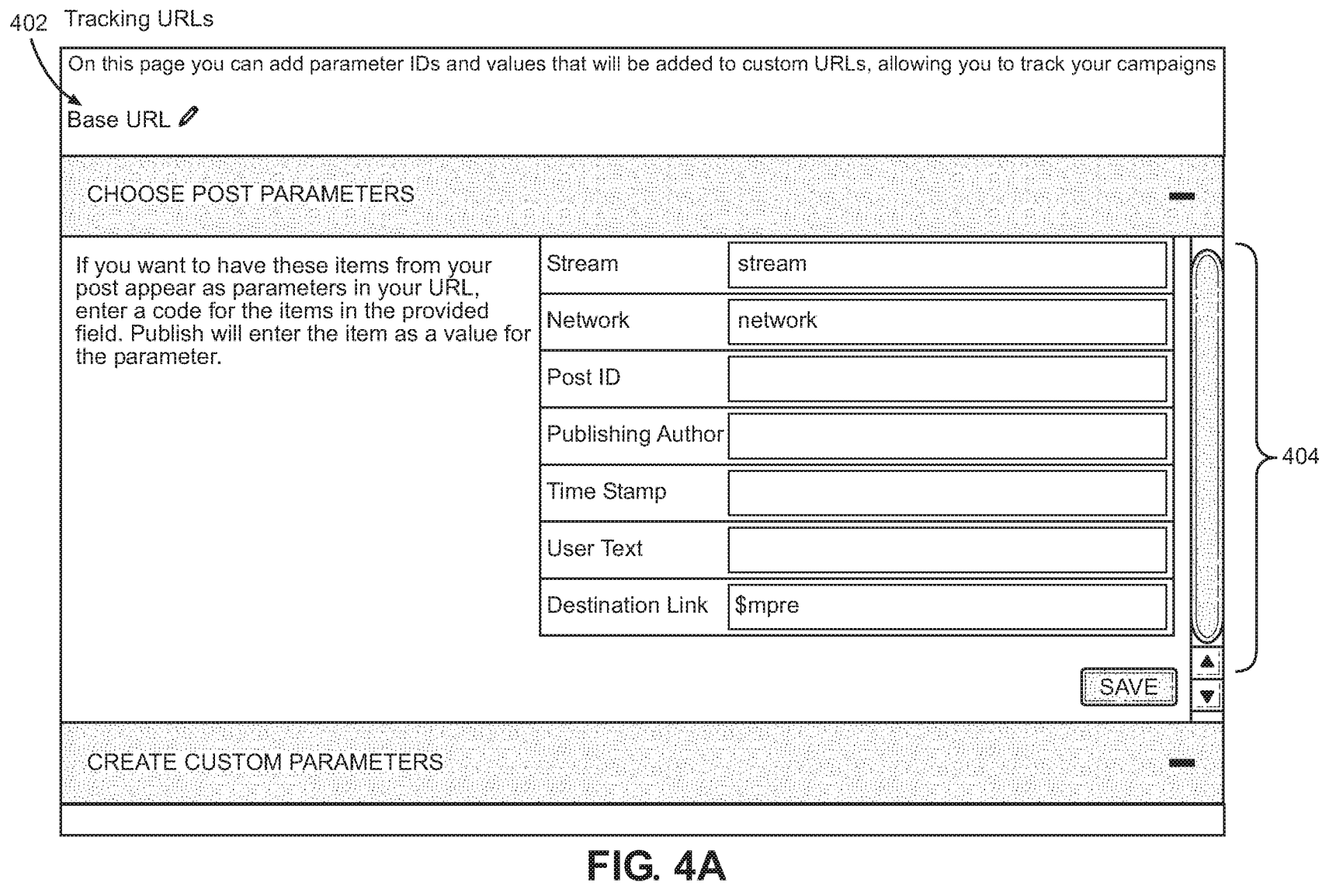
Figure 4B:
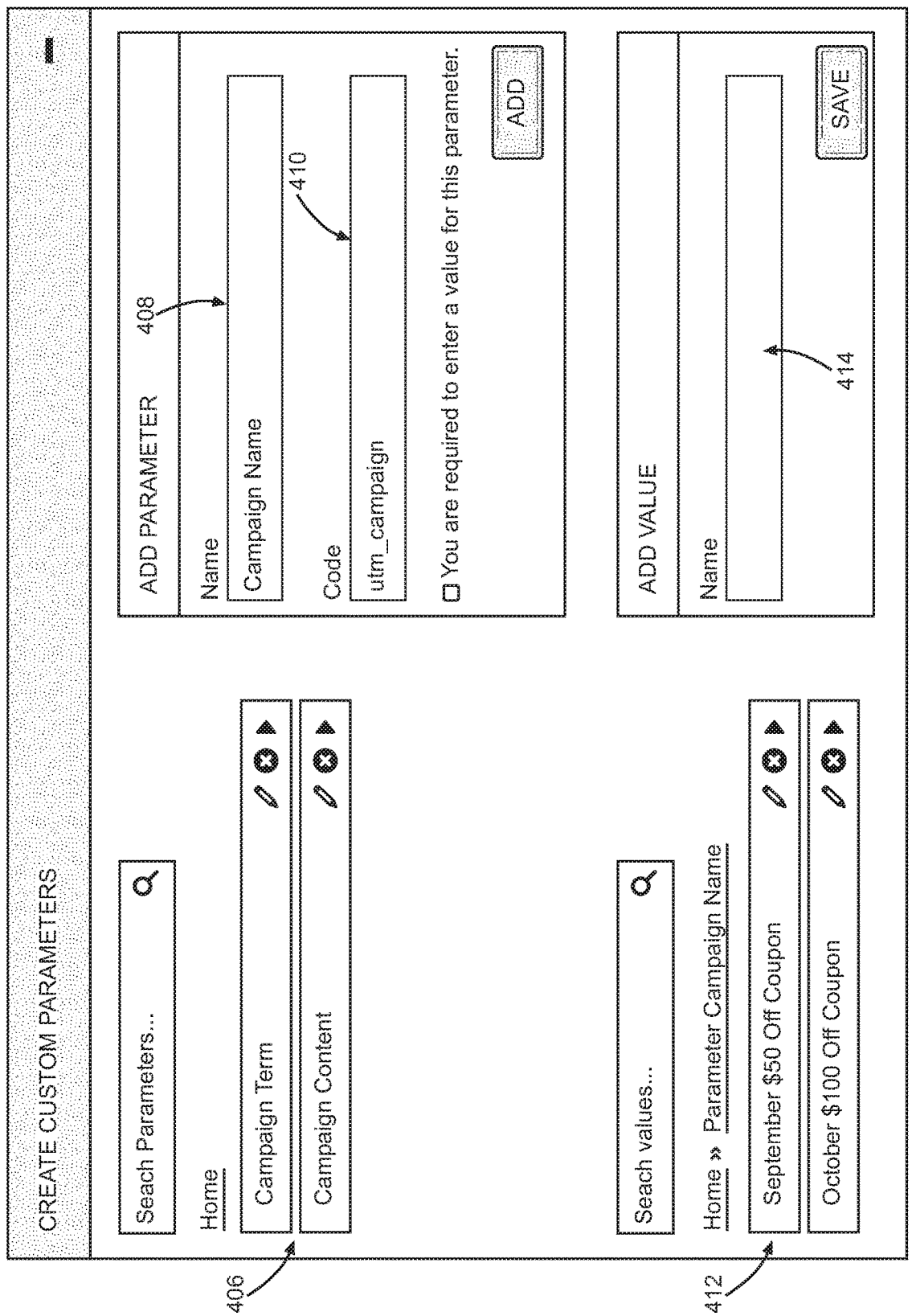

FIGS. 4A and 4B illustrate a user interface for creating a template for dynamic tracking links in accordance with some embodiments. Tracking URL templates may be used by users when creating SRM posts. A user may select a template that corresponds to a desired tracking service, and the template will be able to automatically read the parameters and format them for use by the particular tracking service.

FIG. 4A illustrates an example interface for creating a template for dynamically creating tracking URLs. At 402, the user may specific a specific base URL. This is used in creating wrapped URLs, wherein the base URL corresponds to the tracking service used. A plurality of fields 404 may be used to specify the tag names for post parameters. For example, different tracking services may both have a tag for "Stream" (i.e., social network site published to), but it may be spelled or formatted in different ways. Thus, by specifying tag names for post parameters, a user can create templates compatible with different tracking services.

Post parameters are typically parameters associated with a post that are not specific to tracking. For example, every published SRM post will typically have a stream and network that it is published on, regardless of whether or not tracking is being used. In some embodiments, all published SRM posts will have an associated post ID, publishing author, time stamp, user text, and URL destination link.

In addition to post parameters, a tracking URL may also contain custom parameters. Custom parameters are typically parameters included specifically for tracking purposes, and may provide a user with additional ways to use and analyze the tracking data. For example, custom parameters may include campaign details (name, term, type/category, etc.), post objective, landing page type, etc.

FIG. 4B illustrates an interface for a user to create additional custom parameters. For example, in the illustrated embodiment, existing custom parameters ("campaign term" and "campaign content") are displayed at 406. A user may specify a new "Campaign Name" parameter. The parameter may have a display name 408 (for use in user interfaces) and a code 410 (the actual parameter name appended to the tracking URL). In some embodiments, certain custom parameters may be limited to certain values. For example, in some embodiments a campaign name parameter for a post may only be selected from a list of existing campaigns. For example, list 412 shows available values for the "campaign name" parameter. When creating/modifying custom parameters, a user may remove or modify the list of available values 412 for the parameter, and add additional values to the list using an interface at 414. In some embodiments, the user may also specify that values for a particular custom parameter are limited to a particular format, such as a text string or a number.

Figure 5:
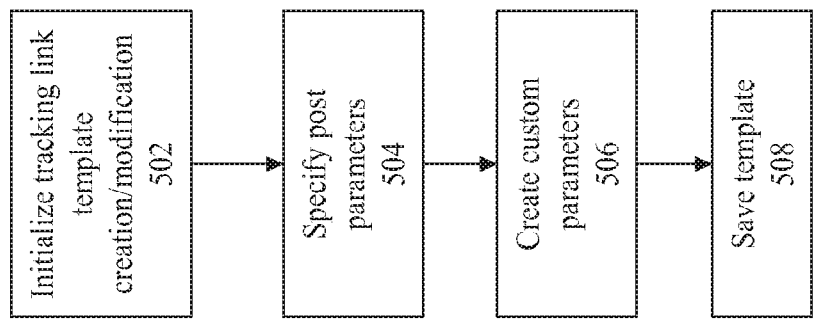
FIG. 5 illustrates a flowchart of a process for creating a tracking URL template in accordance with some embodiments.

FIG. 5 illustrates a flow chart for setting up a dynamic link tracking template in accordance with some embodiments. First, at 502, the user initializes the creation of a new tracking link template or modification of an existing tracking link template. In some embodiments, the user also selects for a new template whether the tracking URL will be a wrapped URL or an appended URL. Whether the tracking URL will be a wrapped URL or an appended URL will typically depend on the tracking service that the template will be associated with.

At 504, post parameters are specified. Post parameters may include mandatory parameters that will be included with every tracking URL, such as stream, post ID, destination URL, etc. These parameters are typically extracted automatically when a user creates a new post, and do not require the user to specifically specify them outside of creating the actual content for the post. In some embodiments, certain post parameters, such as time stamp, may be optional.

At 506, the user may optionally define one or more custom parameters. Custom parameters are typically optional and are generally specified by a user when creating the post. These may include a campaign name that the post is associated with, campaign term, landing page type, user text/memo, etc. In some embodiments, the user may also specify available values for a custom parameter. For example, the user may specify a "campaign season" parameter that may only have the values of Spring, Summer, Fall, or Winter.

Once the user has finished specifying post parameters and desired custom parameters, the template may be saved at 508 and become available to be used for dynamically creating tracking URLs for SRM posts.

Figure 6:
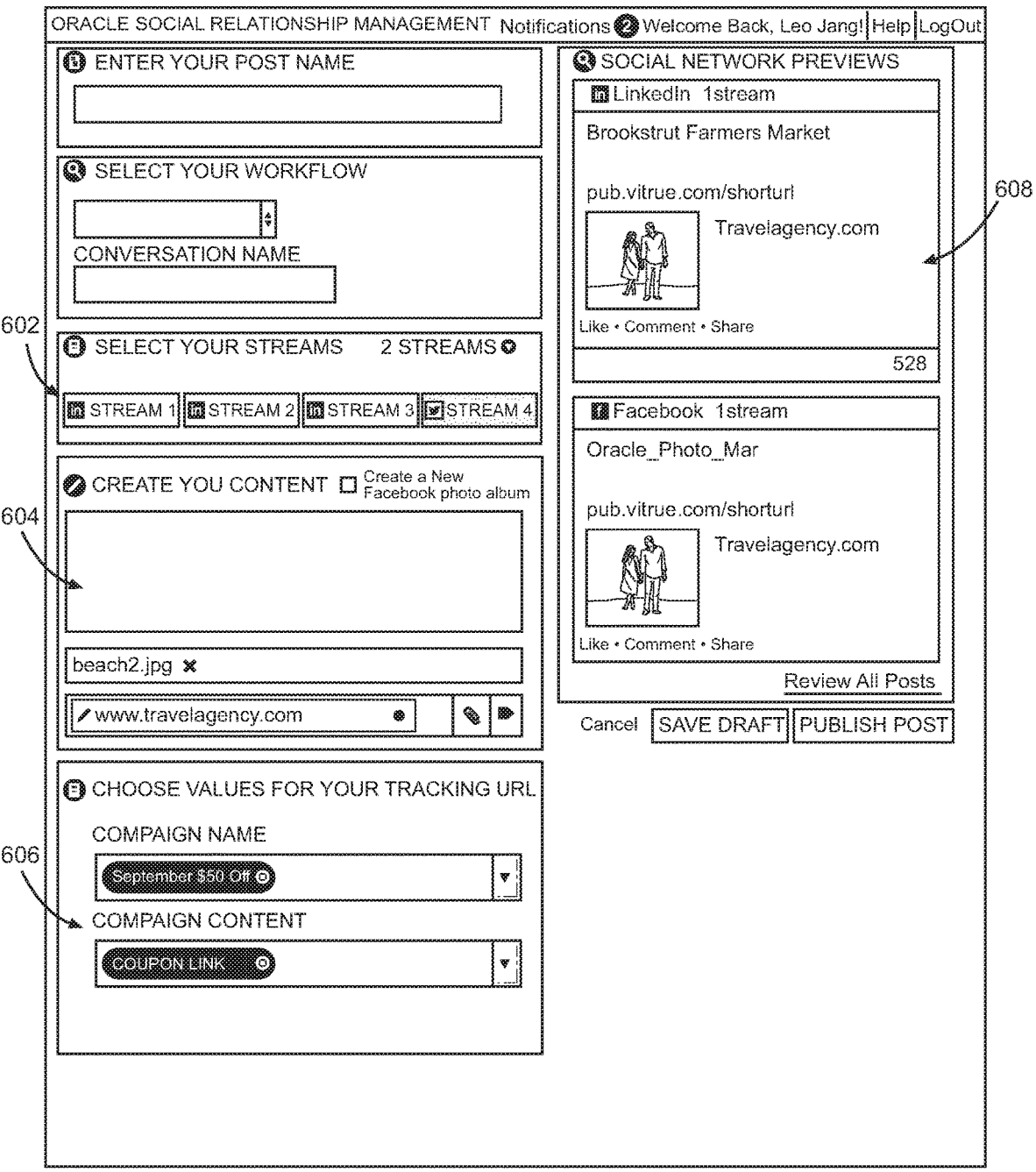
FIG. 6 illustrates a user interface for creating a new SRM post with a dynamically created tracking URL in accordance with some embodiments.

FIG. 6 illustrates an example interface for creating an SRM post using a tracking URL template in accordance with some embodiments. One or more interface elements at 602 allow the user to select the stream to publish to. Different streams may correspond to different social media sites (Facebook, Twitter, LinkedIn, etc.). In some embodiments, streams may also correspond to different pages or accounts in the same social network (e.g., a user may be able to publish posts to multiple Facebook pages). A steam may also correspond to an email or mailing list, or to a site that is not a social media site. In some embodiments, multiple streams may be selected (e.g., the same post will be published to multiple sites and/or pages). For example, in the embodiment illustrated in FIG. 6, two different streams have been selected.

The user may at 604 create the content for the post. In some embodiments, the user enters in text using a text field. There may also be options to allow a user to upload or attach pictures, videos, or other media.

In some embodiments, when creating SRM posts containing tracking URLs, a tracking URL template is automatically associated with the SRM posts to be created. For example, a marketer may use a particular tracking service, and thus specify a default tracking URL template to be used with that tracking service. When a user initiates creation of a new SRM post, that tracking URL template may be automatically selected.

In some embodiments, SRM posts are associated with a marketing campaign, wherein the marketing campaign is associated with a particular tracking URL template. Thus, the particular tracking URL template associated with the particular marketing campaign may be loaded automatically for SRM posts for the marketing campaign. In other embodiments, the user may specify a desired tracking URL template to be used.

At 606, the user may specify the custom parameters to be included in the tracking URL, based upon the custom parameters that have been defined for the tracking URL template, such as Campaign Name, Term, Contact, etc. In some embodiments, drop-down menus or other interface controls may be used that allow selection of a custom parameter value from one or more designated values. The designated values may correspond to the custom parameter values specified during creation of the tracking URL template (e.g., as illustrated in FIG. 4B). For example, in the illustrated embodiment, a user has specified that campaign that the post is associated with is "September 50% off" and "coupon link" content.

In some embodiments, a preview of the post to be published may be displayed at 608, allowing the user to see how the post will look and to make any necessary changes before the post is actually published. In some embodiments, if more than one stream was selected at 602, a preview of the post for each selected stream may be displayed, or for each different social media site corresponding to the selected streams.

When the user publishes the post (e.g., by clicking on the "Publish Post" button), the post will be published to the selected streams. In addition, a tracking URL will be automatically generated based upon the selected tracking template. For example, post parameters (e.g., stream, post ID, etc.) are automatically extracted from the post and matched to the tag names specified in the tracking URL template. In addition, the custom parameters inputted by the user are formatted in accordance with the tracking URL template to be included as part of the tracking URL. The generated tracking URL can then be published with the post on the selected streams. Thus, the use of tracking URL templates allows for creation of tracking URLs for SRM posts, without requiring the user to write the tracking URL themselves or to be familiar with the format of tracking URLs or the tracking service.

Figure 7:
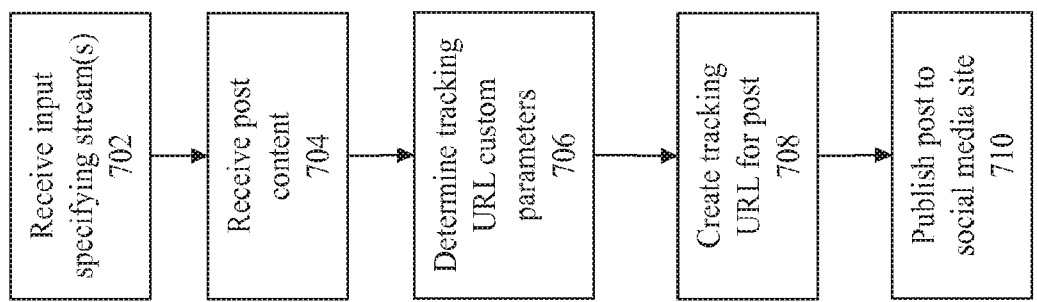
FIG. 7 illustrates a flowchart of a process for creating a new SRM post with a dynamically created tracking URL in accordance with some embodiments.

FIG. 7 illustrates a flow chart of a process for creating an SRM post containing a tracking URL in accordance with some embodiments. At 702, a stream for publishing is specified (e.g., a social media site, a particular profile/page on a social media site). In some embodiments, multiple streams may be specified, wherein the post will be published to each of the selected streams. At 704, content for the post is received. The content may include text, and may also include pictures, videos, or other media. The user may also specify a particular tracking URL template to use for the tracking URL. In some embodiments, a particular tracking URL template may already be associated with a stream, such that selecting a stream at 702 also results in an associated tracking URL template being selected.

At 706, custom parameter values for the tracking URL may be specified. The tracking URL template may specify one or more custom parameters that may be included in a tracking URL. In some embodiments, a list of custom parameters available for the selected tracking URL template is displayed to the user, who then selects and specifies values for the parameters that they wish to include in the tracking URL. In some embodiments, the tracking URL template may also specify which values can be selected for one or more custom parameters (e.g., a "campaign season" parameter may be limited to the values of Spring, Summer, Fall, or Winter).

At 708, the tracking URL is created. The tracking URL is formed using post parameters, which may be extracted automatically, and the user-specified custom parameter values. The parameters may be mapped to tag names specified during creation of the tracking URL template, so that the tracking URL will match the format of the tracking service used.

In some embodiments, the tracking URL may be mapped to a shortened URL. This may be necessary to adhere to character limits specified by some social media site, or may be done for aesthetic reasons, to create a cleaner-looking post for consumers to view. When a consumer clicks on a shortened URL, the corresponding full tracking URL is found through the URL mappings. At 710, the post content and tracking or shortened URL are posted to the selected stream(s).

Figure 8:
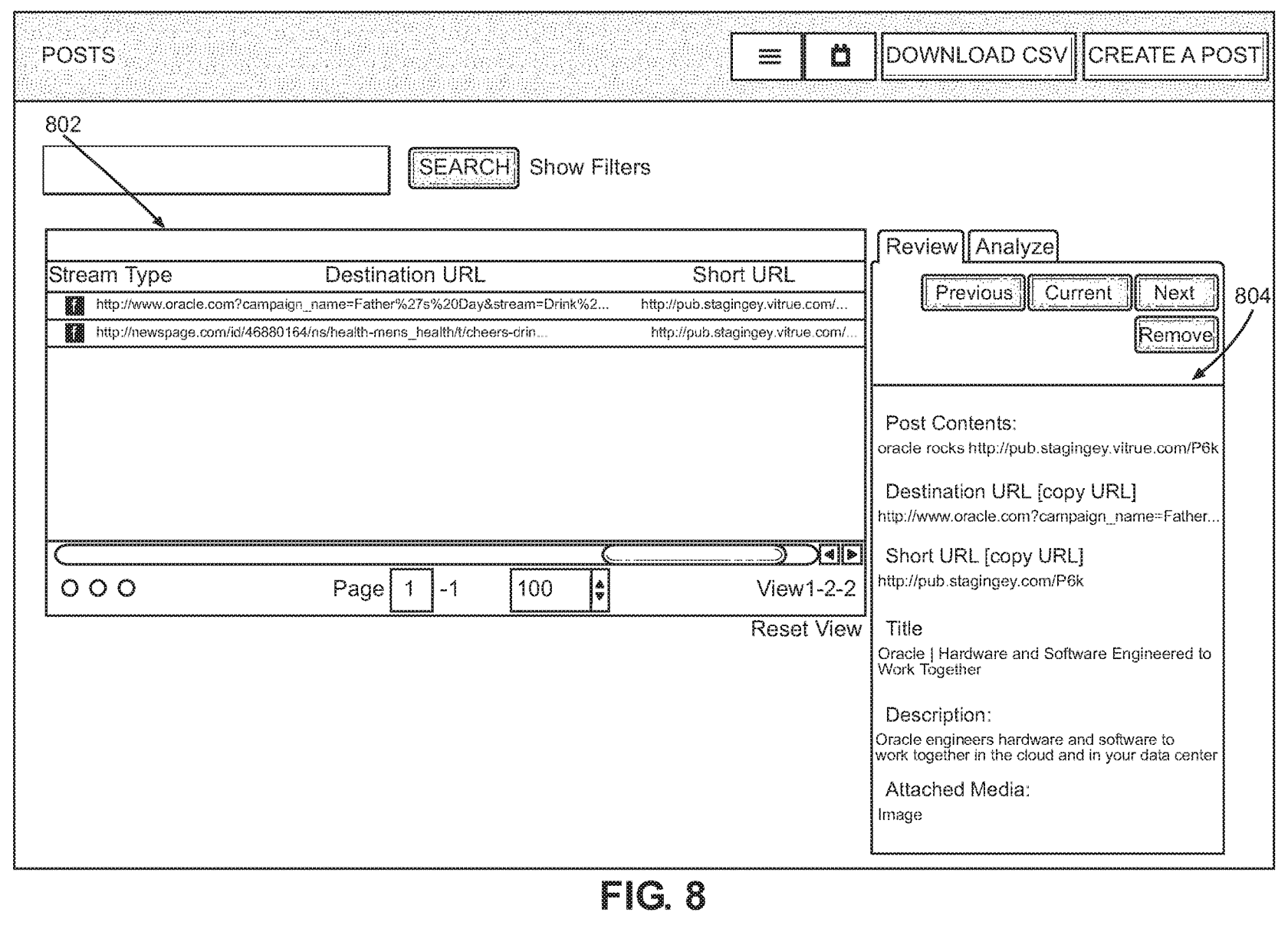

FIG. 8 illustrates an example interface for monitoring SRM post histories in accordance with some embodiments. A table or grid 802 listing a history of previously created posts is displayed. Various columns, such as stream type, tracking URL, shortened URL, post item, etc. may be used to allow a user to better be able to view and sort the post history. In some embodiments, table 802 may contain columns corresponding to one or more parameters associated with the posts, allowing for the posts to be sorted by particular parameters. In some embodiments, when the user clicks on a post entry in table 802, more detailed information regarding the post may be displayed at 804.

Figure 9A:
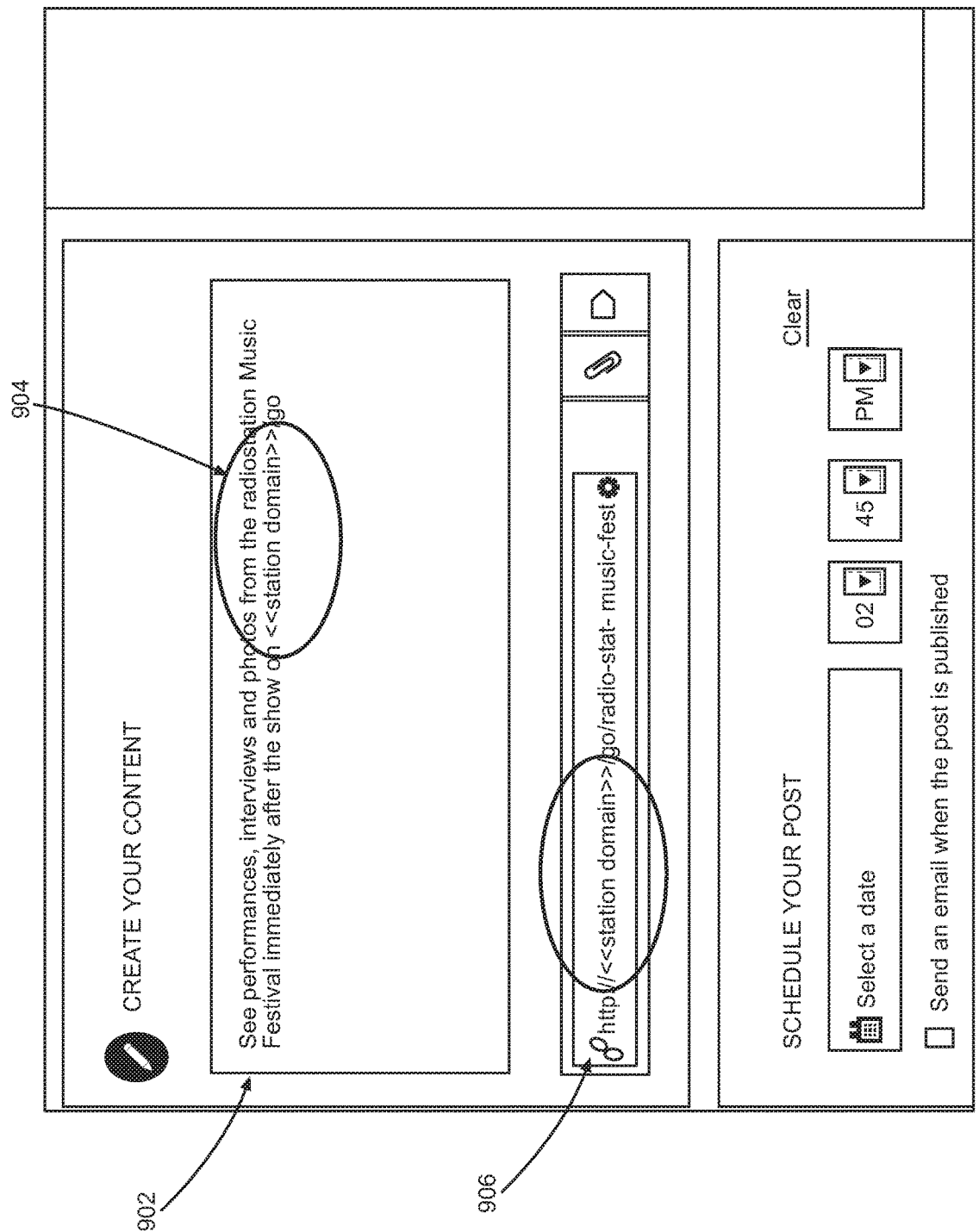
FIGS. 9A-9C illustrate dynamic variables in accordance with some embodiments.
Figure 9B:
Figure 9C:
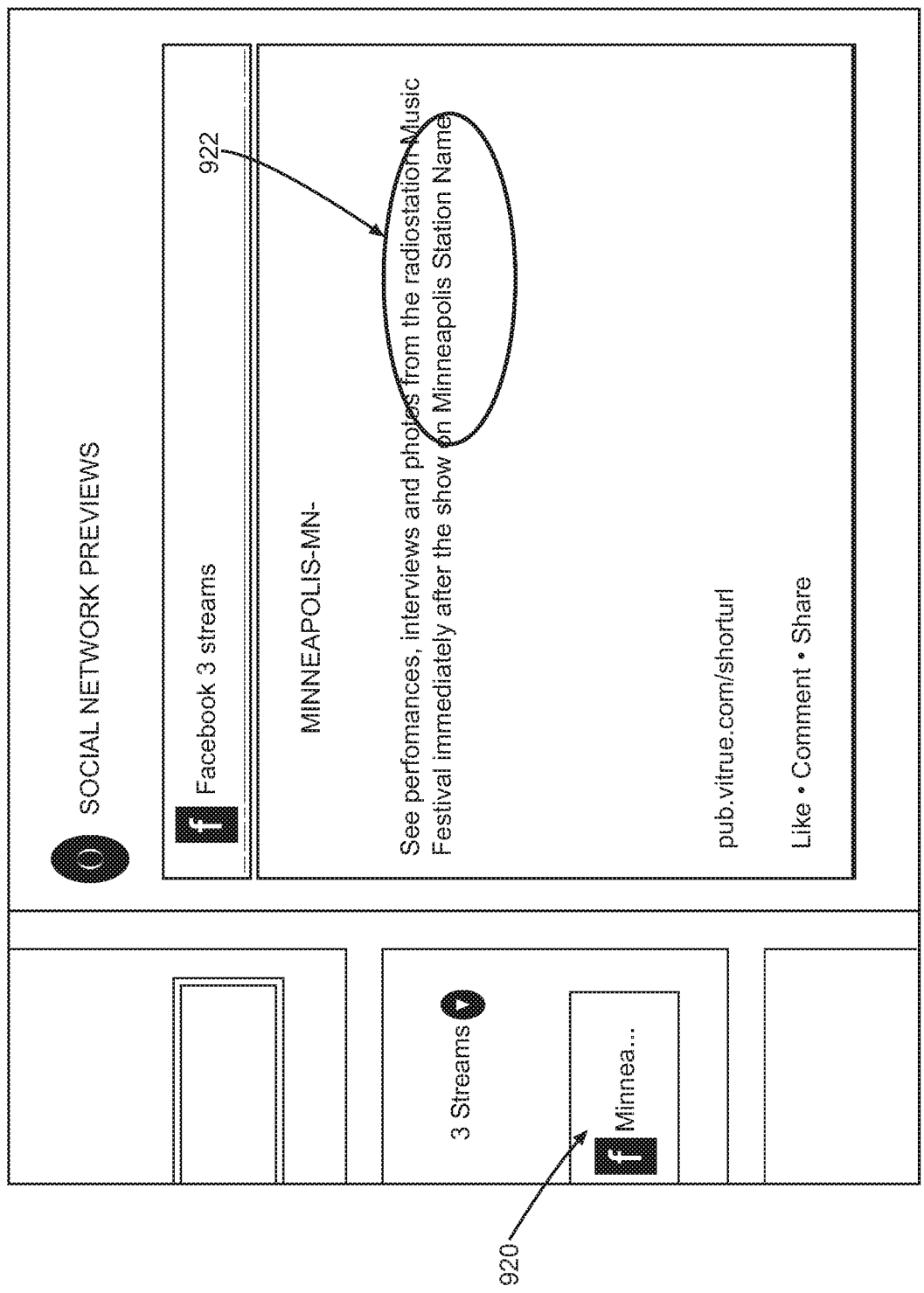

In some embodiments, as illustrated in FIGS. 9A-9C, dynamic variables may be used to allow users of the SRM to localize corporate approved content by the utilization of custom variable(s) within various social media content. For example, a single message may be published to a plurality of outlets (e.g., pages for different franchises, stations, retailers, agents, branch locations, etc.) that contains localized information for the outlets, allowing for the different outlets to take advantage of common content and not have to individually create the content themselves. In some embodiments, a page associated with a particular outlet may contain embedded tab modules corresponding to unique, branded content (e.g., tabs corresponding to different franchises, stations, branch locations, etc.). In some embodiments, dynamic variables may also be used as part of conversation suite responses, wherein an SRM user may review and take action on messages from different social media outlets (e.g., responding to a message).

FIG. 9A illustrates an example message 902 containing a dynamic variable 904. Message 902 may be published to a plurality of different streams. For example, the marketer may be a national radio station having a plurality of local stations, wherein each stream may correspond to a different local station. When message 902 is published, dynamic variable 904 (station_id) is replaced by a station_id value corresponding to the stream published to. In addition, message 902 may be associated with a URL 906. URL 906 may also contain a dynamic variable, to be replaced with a different page address depending upon the stream published to.

FIG. 9B illustrates an example interface for defining dynamic variables in accordance with some embodiments. The interface allows a user to define a "label", a "variable name" and a default value to be used if the stream being published to does not have its own dynamic variable value. This feature set would allow clients across a horizontal market to have an efficient way to localize corporate approved social media content across a large number of social properties or a large number of globally distributed users.

FIG. 9C illustrates a message containing a dynamic variable being used to create an SRM post containing localized content. In some embodiments, a stream may be associated with dynamic variable values, such that when a post containing dynamic variables is published to the stream, the dynamic variable values associated with the stream are used to fill in the dynamic variables. For example, FIG. 9C illustrates a post being published on a stream associated with a Minneapolis station. The stream is associated with a data value (e.g., Minneapolis Station Name) for the station_id dynamic variable. Thus, when the message is published, the data value is displayed is the message at the location of the dynamic variable at 922.

Figure 10:
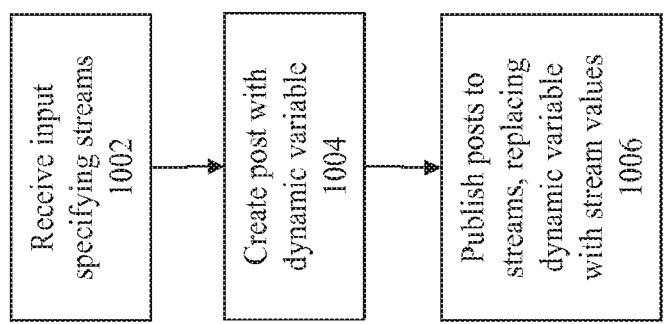
FIG. 10 illustrates a flowchart of a process for using dynamic variables in accordance with some embodiments.

FIG. 10 illustrates a flowchart of a process for using dynamic variables in accordance with some embodiments. At 1002, streams for publishing an SRM post are specified. At 1004, the user creates an SRM post that contains one or more dynamic variables. The dynamic variables may comprise placeholders that are to be replaced with stream-specific values when published. For example, each stream may correspond to a different branch location of the marketer. The SRM post may include dynamic variables such as branch name or branch address, which are to be replaced with the actual stream-specific branch name and address values when published to the streams. This allows for a user to write a single post that can be published to a plurality of different streams with stream-specific information, instead of having to write individual posts for each stream.

At 1006, the post is published to the plurality of streams. During publishing, the values for each stream (e.g., branch name, location) are used to replace the dynamic variable in the SRM post, such that each post published to a stream contains the stream-specific values in place of the dynamic variable placeholders. In some embodiments, if a particular stream does not have its own stream-specific values, a default value may be used.

Therefore, what has been described is an approach for implementing a system, method, and computer program product for creating and using dynamic link templates for creating dynamic links to track and analysis consumer behavior and interactions with social media messages.

SYSTEM ARCHITECTURE OVERVIEW

Figure 11:
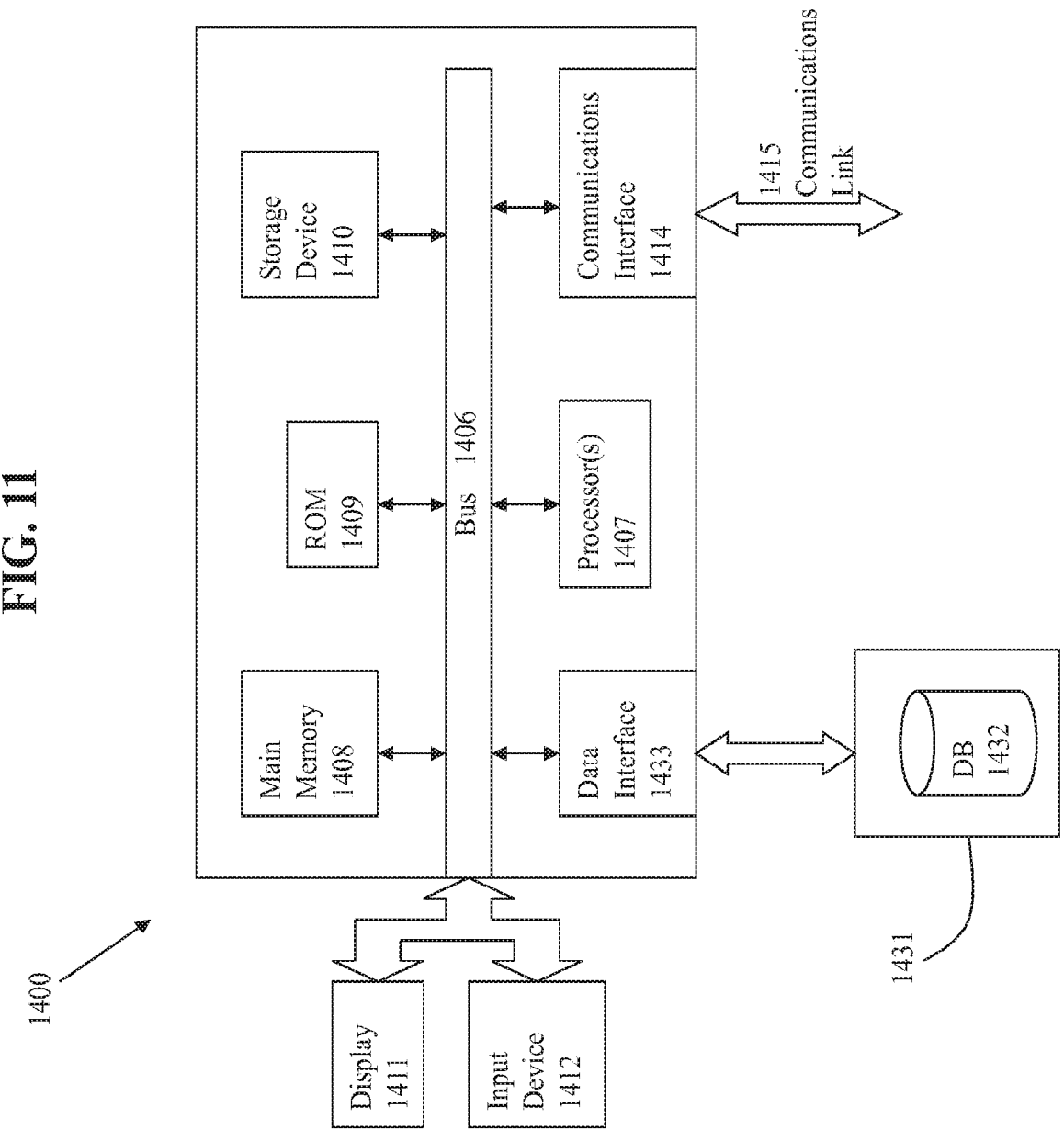
FIG. 11 illustrates a computerized system on which an embodiment of the invention can be implemented.

FIG. 11 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be stored in a database 1432 on a storage medium 1431 which is accessed through data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. One or more non-transitory machine-readable media storing instructions which, when executed by one or more processors, cause:
   identifying a first set of training data including:
   (a) a set of feature vectors respectively associated with a set of prior campaigns; and
   (b) a set of campaign success metrics respectively associated with the set of prior campaigns;
   applying supervised machine learning to the first set of training data to perform pattern recognition on the first set of training data;
   based on the supervised machine learning, determining a set of one or more preferred feature vectors;
      wherein campaign success metrics associated with the set of preferred feature vectors indicate more success for particular campaign success metrics than campaign success metrics associated with a set of non-preferred feature vectors;
      wherein indicating more success is associated with at least one of: higher values for a first campaign success metric and lower values for a second campaign success metric;
   determining a set of one or more preferred campaign configurations respectively associated with the set of preferred feature vectors;
      wherein at least one of the set of preferred campaign configurations is associated with a particular preferred feature vector, of the set of preferred feature vectors, that is different from each of the set of feature vectors;
   publishing, to one or more social media platforms, a plurality of messages associated, respectively, with a plurality of social media campaigns;
   receiving user interaction data associated with a plurality of interactions, by a plurality of users of the one or more social media platforms, with the plurality of messages;
   determining quantified measurements respectively associated with the plurality of social media campaigns based on the user interaction data;
   vectorizing the quantified measurements to generate a plurality of vectorized quantified measurements respectively associated with the plurality of social media campaigns;
      wherein the plurality of vectorized quantified measurements is stored in a cloud storage environment, and the cloud storage environment is access-controlled to secure the plurality of vectorized quantified measurements;
   identifying a second set of training data comprising:
   (a) a plurality of campaign characteristics respectively associated with the plurality of social media campaigns; and
   (b) the plurality of vectorized quantified measurements respectively associated with the plurality of social media campaigns;
   applying unsupervised machine learning to the second set of training data to perform clustering on the second set of training data;
   determining a first cluster of a first subset of the plurality of social media campaigns having similar campaign characteristics;
      wherein quantified measurements associated with the first cluster are expected be higher than quantified measurements associated with a second cluster of a second subset of the plurality of social media campaigns, given a target set of request parameters;
   receiving a request to determine a target campaign configuration based on the target set of parameters;
   determining, for a preferred campaign configuration, of the set of preferred campaign configurations, campaign characteristics selected based on the first cluster of social media campaigns; and
   configuring a target campaign based on the preferred campaign configuration.

2. The one or more media of claim 1, wherein the unsupervised clustering algorithm comprises one or more of k-means clustering or hierarchical clustering.

3. The one or more media of claim 1, wherein the set of feature vectors is determined based on campaign configuration data comprising one or more of:
   campaign templates used, user-selected variable values, content localization settings, or message contents.

4. The one or more media of claim 1, wherein the preferred campaign configuration is a new campaign template not previously used with any of the set of prior campaigns.

5. The one or more media of claim 1, wherein the user interaction data comprises one or more of: tracking uniform resource locator (URL) parameters, tracking URL parameter values, tracking URL clickthrough rates, message viewing times, conversion rates, costs per click, social media platforms targeted, or user demographic data.

6. The one or more media of claim 1, wherein receiving user interaction data comprises tracking one or more user interactions via a tracking uniform resource locator (URL), the one or more media further storing instructions which, when executed by one or more processors, cause:
 receiving, via a first component of a graphical user interface (GUI) for defining custom tracking URL parameters, first user input defining a user-defined parameter name for a user-defined custom tracking URL parameter;
 receiving, via a second component of the GUI, second user input defining one or more user-defined available values for the user-defined custom tracking URL parameter;
 storing a tracking URL template comprising the user-defined custom tracking URL parameter;
 receiving user-generated content to be published to a particular Internet stream selected from a plurality of Internet streams supported by a social relationship management (SRM) service;
 receiving third user input selecting the tracking URL template from a plurality of tracking URL templates;
 loading, responsive to the first user input, the tracking URL template for use with the user-generated content;
 receiving fourth user input selecting a value of the user-defined custom tracking URL parameter from the one or more user-defined available values for the user-defined custom tracking URL parameter;
 generating the tracking URL, based on the tracking URL template, wherein the tracking URL comprises the user-defined parameter name and the value of the user-defined custom tracking URL parameter; and
 publishing the user-generated content and the tracking URL to the particular Internet stream.

7. The one or more media of claim 1, wherein receiving user interaction data comprises tracking one or more user interactions with a localized social media message, the one or more media further storing instructions which, when executed by one or more processors, cause:
 storing a plurality of localized values of a localized variable, wherein each localized value in the plurality of localized values is associated, respectively, with a particular Internet stream in a plurality of Internet streams supported by a social relationship management (SRM) service;
 receiving user-generated content to be published to a particular Internet stream selected from the plurality of Internet streams;
 determining, by the management application, that the user-generated content comprises a placeholder for the localized variable;
 retrieving a particular localized value of the localized variable from the plurality of localized values, wherein the particular localized value is associated with the particular Internet stream;
 replacing the placeholder with the particular localized value, to obtain localized content; and
 publishing a localized social media message, comprising the localized content and a tracking URL, to the particular Internet stream.

8. The media of claim 1, wherein the quantified measurements respectively associated with the plurality of social media campaigns comprises at least one of sentiment level and engagement level.

9. The media of claim 1, further storing instructions comprising:
 determining a mandatory campaign configuration setting based on the request;
 determining the preferred campaign configuration that satisfies the mandatory campaign configuration setting.

10. The media of claim 1, further storing instructions comprising:
 determining a particular business objective based on the request;
 determining the preferred campaign configuration for achieving the particular business objective.

11. The media of claim 1, further storing instructions comprising:
 presenting, via a user interface, a recommendation for the preferred campaign configuration;
 receiving, via the user interface, user input accepting the recommendation;
 wherein configuring the target campaign based on the preferred campaign configuration is responsive to the user input accepting the recommendation.

12. A system comprising:
 at least one device including at least one hardware processor;
 and a system memory storing instructions, which when executed by the at least one hardware processor, causes the at least one hardware processor to perform operations comprising:
 identifying a first set of training data including:
  (a) a set of feature vectors respectively associated with a set of prior campaigns; and
  (b) a set of campaign success metrics respectively associated with the set of prior campaigns;
 applying supervised machine learning to the first set of training data to perform pattern recognition on the first set of training data;
 based on the supervised machine learning, determining a set of one or more preferred feature vectors;
  wherein campaign success metrics associated with the set of preferred feature vectors indicate more success than campaign success metrics associated with a set of non-preferred feature vectors;
   wherein indicating more success is associated with at least one of: higher values for a first campaign success metric and lower values for a second campaign success metric;
 determining a set of one or more preferred campaign configurations respectively associated with the set of preferred feature vectors;
  wherein at least one of the set of preferred campaign configurations is associated with a particular preferred feature vector, of the set of preferred feature vectors, that is different from each of the set of feature vectors;
 publishing, to one or more social media platforms, a plurality of messages associated, respectively, with a plurality of social media campaigns;

receiving user interaction data associated with a plurality of interactions, by a plurality of users of the one or more social media platforms, with the plurality of messages;

determining quantified measurements respectively associated with the plurality of social media campaigns based on the user interaction data;

vectorizing the quantified measurements to generate a plurality of vectorized quantified measurements respectively associated with the plurality of social media campaigns;

wherein the plurality of vectorized quantified measurements is stored in a cloud storage environment, and the cloud storage environment is access-controlled to secure the plurality of vectorized quantified measurements;

identifying a second set of training data comprising:
(a) a plurality of campaign characteristics respectively associated with the plurality of social media campaigns; and
(b) the plurality of vectorized quantified measurements respectively associated with the plurality of social media campaigns;

applying unsupervised machine learning to the second set of training data to perform clustering on the second set of training data;

determining a first cluster of a first subset of the plurality of social media campaigns having similar campaign characteristics;

wherein quantified measurements associated with the first cluster are expected be higher than quantified measurements associated with a second cluster of a second subset of the plurality of social media campaigns, given a target set of request parameters;

receiving a request to determine a target campaign configuration based on the target set of parameters;

determining, for a preferred campaign configuration, of the set of preferred campaign configurations, campaign characteristics selected based on the first cluster of social media campaigns; and configuring a target campaign based on the preferred campaign configuration.

13. The system of claim 12, wherein the unsupervised clustering algorithm comprises one or more of k-means clustering or hierarchical clustering.

14. The system of claim 12, wherein the set of feature vectors is determined based on campaign configuration data comprising one or more of: campaign templates used, user-selected variable values, content localization settings, or message contents.

15. The system of claim 12, wherein the preferred campaign configuration is a new campaign template not previously used with any of the set of prior campaigns.

16. The system of claim 12, wherein the user interaction data comprises one or more of: tracking uniform resource locator (URL) parameters, tracking URL parameter values, tracking URL clickthrough rates, message viewing times, conversion rates, costs per click, social media platforms targeted, or user demographic data.

17. The system of claim 12, wherein receiving user interaction data comprises tracking one or more user interactions via a tracking uniform resource locator (URL), the operations further comprising:

receiving, via a first component of a graphical user interface (GUI) for defining custom tracking URL parameters, first user input defining a user-defined parameter name for a user-defined custom tracking URL parameter;

receiving, via a second component of the GUI, second user input defining one or more user-defined available values for the user-defined custom tracking URL parameter;

storing a tracking URL template comprising the user-defined custom tracking URL parameter;

receiving user-generated content to be published to a particular Internet stream selected from a plurality of Internet streams supported by a social relationship management (SRM) service;

receiving third user input selecting the tracking URL template from a plurality of tracking URL templates;

loading, responsive to the first user input, the tracking URL template for use with the user-generated content;

receiving fourth user input selecting a value of the user-defined custom tracking URL parameter from the one or more user-defined available values for the user-defined custom tracking URL parameter;

generating the tracking URL, based on the tracking URL template, wherein the tracking URL comprises the user-defined parameter name and the value of the user-defined custom tracking URL parameter; and publishing the user-generated content and the tracking URL to the particular Internet stream.

18. The system of claim 12, wherein receiving user interaction data comprises tracking one or more user interactions with a localized social media message, the operations further comprising:

storing a plurality of localized values of a localized variable, wherein each localized value in the plurality of localized values is associated, respectively, with a particular Internet stream in a plurality of Internet streams supported by a social relationship management (SRM) service;

receiving user-generated content to be published to a particular Internet stream selected from the plurality of Internet streams;

determining, by the management application, that the user-generated content comprises a placeholder for the localized variable;

retrieving a particular localized value of the localized variable from the plurality of localized values, wherein the particular localized value is associated with the particular Internet stream;

replacing the placeholder with the particular localized value, to obtain localized content; and publishing a localized social media message, comprising the localized content and a tracking URL, to the particular Internet stream.

19. A method comprising:
identifying a first set of training data including:
(a) a set of feature vectors respectively associated with a set of prior campaigns; and
(b) a set of campaign success metrics respectively associated with the set of prior campaigns;

applying supervised machine learning to the first set of training data to perform pattern recognition on the first set of training data;

based on the supervised machine learning, determining a set of one or more preferred feature vectors;

wherein campaign success metrics associated with the set of preferred feature vectors indicate more success than campaign success metrics associated with a set of non-preferred feature vectors;

wherein indicating more success is associated with at least one of: higher values for a first campaign success metric and lower values for a second campaign success metric;

determining a set of one or more preferred campaign configurations respectively associated with the set of preferred feature vectors;

wherein at least one of the set of preferred campaign configurations is associated with a particular preferred feature vector, of the set of preferred feature vectors, that is different from each of the set of feature vectors;

publishing, to one or more social media platforms, a plurality of messages associated, respectively, with a plurality of social media campaigns;

receiving user interaction data associated with a plurality of interactions, by a plurality of users of the one or more social media platforms, with the plurality of messages;

determining quantified measurements respectively associated with the plurality of social media campaigns based on the user interaction data;

vectorizing the quantified measurements to generate a plurality of vectorized quantified measurements respectively associated with the plurality of social media campaigns;

wherein the plurality of vectorized quantified measurements is stored in a cloud storage environment, and the cloud storage environment is access-controlled to secure the plurality of vectorized quantified measurements;

identifying a second set of training data comprising:
(a) a plurality of campaign characteristics respectively associated with the plurality of social media campaigns; and
(b) the plurality of vectorized quantified measurements respectively associated with the plurality of social media campaigns;

applying unsupervised machine learning to the second set of training data to perform clustering on the second set of training data;

determining a first cluster of a first subset of the plurality of social media campaigns having similar campaign characteristics;

wherein quantified measurements associated with the first cluster are expected be higher than quantified measurements associated with a second cluster of a second subset of the plurality of social media campaigns, given a target set of request parameters;

receiving a request to determine a target campaign configuration based on the target set of parameters;

determining, for a preferred campaign configuration, of the set of preferred campaign configurations, campaign characteristics selected based on the first cluster of social media campaigns; and configuring a target campaign based on the preferred campaign configuration;

wherein the method is performed by at least one device comprising a hardware processor.

20. The method of claim 19, wherein the unsupervised clustering algorithm comprises one or more of k-means clustering or hierarchical clustering.

21. The method of claim 19, wherein the set of feature vectors is determined based on campaign configuration data comprising one or more of: campaign templates used, user-selected variable values, content localization settings, or message contents, and wherein the user interaction data comprises one or more of: tracking uniform resource locator (URL) parameters, tracking URL parameter values, tracking URL clickthrough rates, message viewing times, conversion rates, costs per click, social media platforms targeted, or user demographic data.

22. The method of claim 19, wherein the preferred campaign configuration is a new campaign template not previously used with any of the set of prior campaigns.

23. The method of claim 19, wherein receiving user interaction data comprises tracking one or more user interactions via a tracking uniform resource locator (URL), the method further comprising:

receiving, via a first component of a graphical user interface (GUI) for defining custom tracking URL parameters, first user input defining a user-defined parameter name for a user-defined custom tracking URL parameter;

receiving, via a second component of the GUI, second user input defining one or more user-defined available values for the user-defined custom tracking URL parameter;

storing a tracking URL template comprising the user-defined custom tracking URL parameter;

receiving user-generated content to be published to a particular Internet stream selected from a plurality of Internet streams supported by a social relationship management (SRM) service;

receiving third user input selecting the tracking URL template from a plurality of tracking URL templates;

loading, responsive to the first user input, the tracking URL template for use with the user-generated content;

receiving fourth user input selecting a value of the user-defined custom tracking URL parameter from the one or more user-defined available values for the user-defined custom tracking URL parameter;

generating the tracking URL, based on the tracking URL template, wherein the tracking URL comprises the user-defined parameter name and the value of the user-defined custom tracking URL parameter; and publishing the user-generated content and the tracking URL to the particular Internet stream.

24. The method of claim 19, wherein receiving user interaction data comprises tracking one or more user interactions with a localized social media message, the method further comprising:

storing a plurality of localized values of a localized variable, wherein each localized value in the plurality of localized values is associated, respectively, with a particular Internet stream in a plurality of Internet streams supported by a social relationship management (SRM) service;

receiving user-generated content to be published to a particular Internet stream selected from the plurality of Internet streams;

determining, by the management application, that the user-generated content comprises a placeholder for the localized variable;

retrieving a particular localized value of the localized variable from the plurality of localized values, wherein the particular localized value is associated with the particular Internet stream;

replacing the placeholder with the particular localized value, to obtain localized content; and publishing a localized social media message, comprising the localized content and a tracking URL, to the particular Internet stream.

\* \* \* \* \*

UNITED STATES PATENT AND TRADEMARK OFFICE
CERTIFICATE OF CORRECTION

PATENT NO. : 11,093,979 B2  
APPLICATION NO. : 16/239057  
DATED : August 17, 2021  
INVENTOR(S) : Strutton et al.

Page 1 of 1

It is certified that error appears in the above-identified patent and that said Letters Patent is hereby corrected as shown below:

In the Drawings

On sheet 9 of 18, in FIG. 4B, Line 9, delete "Seach" and insert -- Search --, therefor.

In the Specification

In Column 4, Line 1, delete "URL," and insert -- URL --, therefor.

In Column 4, Line 18, delete "(hive" and insert -- drive --, therefor.

In Column 6, Line 46, delete "e.g.," and insert -- (e.g., --, therefor.

In Column 7, Line 30, delete "Travel Agency)," and insert -- TravelAgency), --, therefor.

In Column 13, Line 26, delete "PTSN," and insert -- PSTN, --, therefor.

In the Claims

In Column 14, Line 48, in Claim 1, delete "expected" and insert -- expected to --, therefor.

In Column 17, Line 32, in Claim 12, delete "expected" and insert -- expected to --, therefor.

In Column 19, Line 48, in Claim 19, delete "expected" and insert -- expected to --, therefor.

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*